(12) United States Patent
Cornwell et al.

(10) Patent No.: US 7,621,132 B2
(45) Date of Patent: Nov. 24, 2009

(54) PILOT COMBUSTOR FOR STABILIZING COMBUSTION IN GAS TURBINE ENGINES

(75) Inventors: Michael Cornwell, Bloomington, MN (US); Vladimir Dusan Milosavljevic, Finspang (SE)

(73) Assignees: Delavan Inc., West Des Moines, IA (US); Siemens Aktiengesellschaft, Munich (DE)

( * ) Notice: Subject to any disclaimer, the term of this patent is extended or adjusted under 35 U.S.C. 154(b) by 787 days.

(21) Appl. No.: 10/933,888

(22) Filed: Sep. 3, 2004

(65) Prior Publication Data

US 2007/0175219 A1    Aug. 2, 2007

Related U.S. Application Data

(60) Provisional application No. 60/500,518, filed on Sep. 5, 2003.

(51) Int. Cl.
  *F23R 3/12* (2006.01)
(52) U.S. Cl. ............... 60/747; 60/749; 60/750
(58) Field of Classification Search .............. 60/39.826, 60/746, 747, 748, 749, 750
  See application file for complete search history.

(56) References Cited

U.S. PATENT DOCUMENTS

| | | | |
|---|---|---|---|
| 3,792,581 A | | 2/1974 | Handa |
| 3,872,664 A | * | 3/1975 | Lohmann et al. ............... 60/746 |
| 3,937,008 A | * | 2/1976 | Markowski et al. ........... 60/748 |
| 4,698,963 A | * | 10/1987 | Taylor .......................... 60/747 |
| 5,131,334 A | | 7/1992 | Monro |
| 5,220,795 A | * | 6/1993 | Dodds et al. .................. 60/747 |
| 5,365,865 A | | 11/1994 | Monro |
| 5,415,114 A | | 5/1995 | Monro et al. |
| 5,452,574 A | | 9/1995 | Cowell et al. |
| 5,477,685 A | | 12/1995 | Samuelson et al. |
| 5,622,489 A | | 4/1997 | Monro |

(Continued)

FOREIGN PATENT DOCUMENTS

DE    197 28 375 A1    1/1999

(Continued)

OTHER PUBLICATIONS

International Search Report dated Apr. 15, 2005.

(Continued)

*Primary Examiner*—Louis J Casaregola

(57) ABSTRACT

The subject application is directed to burners for gas turbine engines that use a pilot flame to assist in sustaining and stabilizing the combustion process. An embodiment of the disclosed burners includes, inter alia, a burner housing, a pilot combustor and a quencher. The burner housing has axially opposed upstream and downstream end portions. Additionally, the housing has at least one main fuel inlet passage and at least one main air inlet passage which are adapted to supply fuel and air respectively to an internal chamber defined in the housing. The pilot combustor is disposed along the axis of the burner housing and has an inlet for receiving a rich fuel and air mixture, a combustion chamber within which the rich fuel and air mixture is combusted into combustion products, and an outlet for exhausting the combustion products from the combustion chamber. The quencher is disposed within the internal chamber of the burner housing along the central axis and positioned at the outlet of the pilot combustor. The quencher has an air inlet and a plurality of radially-oriented air outlets for directing cooling air toward the outlet of the pilot combustor and quenching the combustion products exhausted from the pilot combustor.

11 Claims, 3 Drawing Sheets

U.S. PATENT DOCUMENTS

| | | | |
|---|---|---|---|
| 5,735,115 A * | 4/1998 | Maghon | 60/804 |
| 6,007,326 A | 12/1999 | Ryan, III et al. | |
| 2001/0022088 A1 * | 9/2001 | Mandai et al. | 60/737 |
| 2002/0125336 A1 | 9/2002 | Bretz | |
| 2002/0139121 A1 | 10/2002 | Cornwell et al. | |

OTHER PUBLICATIONS

JP Patent Abstsracts of Japan, Aug. 3, 1982, Agency of Ind Science & Technol.

* cited by examiner

PILOT COMBUSTOR FOR STABILIZING COMBUSTION IN GAS TURBINE ENGINES

CROSS REFERENCE TO RELATED APPLICATIONS

This application claims priority to U.S. Provisional Patent Application No. 60/500,518, filed Sep. 5, 2003, which is herein incorporated by reference in its entirety.

BACKGROUND OF THE INVENTION

1. Field of the Invention

The subject invention relates to burners for gas turbines, and more particularly, to burners adapted to stabilize engine combustion, and still further, to burners that use a pilot combustor to provide combustion products (e.g., heat and free radicals) to stabilize the main lean premixed combustion.

2. Background of the Related Art

Gas turbines are employed in a variety of applications including electric power generation, military and commercial aviation, pipeline transmission and marine transportation. In a gas turbine engine, fuel and air are provided to a burner chamber where they are mixed and ignited by a flame, thereby initiating combustion. The major problems associated with the combustion process in gas turbine engines, in addition to thermal efficiency and proper mixing of the fuel and air, are flame stabilization, the elimination of pulsations and noise, and the control of polluting emissions, especially nitrogen oxides (NOx).

The combustion process requires heat to be added to the fuel-air mixture in order to initiate the reaction. Once the reaction has started, the heat released by the combustion can be used to initiate the reaction itself and the process becomes self-sustaining. However, some mechanism must be used to transport the heat from the combustion back upstream to the ignition point. Alternatively, where the reaction is not self-sustaining, heat and/or free radicals must be provided from a separate source, such as, a heated catalytic metal surface, or a separate pilot flame. Any combination of these methods, as well as, other methods, can also be used to provide the necessary heat to initiate combustion.

The most common self-sustaining combustion process used in gas turbine engines utilizes swirling air flows that recirculate the combustion products and transport the hot gases and free radicals produced by the previously reacted fuel and air back upstream to initiate the combustion of the freshly mixed fuel and air. A prior art swirl-stabilized burner is illustrated in FIG. 1 and is designate by reference numeral 100. Generally, with swirl-stabilized combustion, the center main recirculation zone is the dominant source of recirculated hot gases and free radicals that are transported upstream to stabilize the combustion. When the combustion process becomes very lean, and therefore, little heat is released from the combustion and the amount of heat and free radicals that are transported back upstream is insufficient to assure that combustion is initiated and sustained. The low temperatures of the lean combustion products produce low equilibrium levels of free radicals. The low temperature of the combustion products caused by the lean combustion also results in a low free radical production rate when the recirculated combustion products mix with the fresh un-reacted premixed fuel and air. Under these conditions the induction time required to initiate combustion becomes excessive and the flame blows away, or becomes unstable and fluctuates in intensity.

The basic problem with lean premixed combustion systems used to produce low NOx emissions is that the fuel-air mixture must be so lean in order to have the flame temperature sufficiently low to prevent NOx production that under many operating conditions the combustion may not produce sufficient heat to be self-sustaining. An auxiliary source of heat and free radical must be used to sustain combustion. If an auxiliary pilot at high temperatures (close to stoichiometric) is used, it will stabilize the lean main flame, but it will produce substantial NOx emissions.

Purely thermally initiated combustion starts the combustion process by pyrolyzing fuel at high temperatures to produce active free radicals. Initially this occurs with very low fuel consumption and no measurable temperature rise. Through chain branching reaction mechanisms the initially produced free radicals create an exponentially increasing pool of free radicals. Eventually the radical pool becomes sufficiently large to consume a significant amount of fuel, leading to rapid ignition (Wamatz). The time it takes for this pool of free radicals to increase sufficiently enough to cause the ignition is the "Ignition-Delay Time" or the "Induction Time". When the initial temperature is increased the production rate of free radicals is increased at an exponential rate and the induction time for initiation of combustion is reduced. If the initial temperature is less than the auto-ignition temperature, no ignition will occur for any time period. Free radicals, as well as, hot gases are contained in the combustion products that are mixed with the fresh premixed fuel-air mixture, in order to initiate combustion. These previously generated free radicals can significantly reduce the induction time for combustion. If the entrained free radicals are in sufficient quantity, rapid combustion initiation will occur at lower temperatures, which would otherwise have long induction times without the entrained free radicals. Stable combustion requires rapid initiation of combustion of the premixed fuel and air immediately after being mixed with the hot products of the previously burnt fuel.

In view of the foregoing, a need exists for an improved burner, which reduces NOx emissions while maintaining a stable combustion process.

SUMMARY OF THE INVENTION

The subject application is directed to burners for gas turbine engines that use a pilot flame to assist in sustaining and stabilizing the combustion process. An embodiment of the disclosed burners includes, inter alia, a burner housing, a pilot combustor and a quencher.

The burner housing has axially opposed upstream and downstream end portions. Additionally, the housing has at least one main fuel inlet passage and at least one main air inlet passage which are adapted to supply fuel and air respectively to an internal chamber defined in the housing.

The pilot combustor is disposed along the axis of the burner housing and has an inlet for receiving a rich fuel and air mixture, a combustion chamber within which the rich fuel and air mixture is combusted into combustion products, and an outlet for exhausting the combustion products from the combustion chamber.

It is envisioned that in specific embodiments of the present invention, the outlet of the pilot combustor has an annular cross-section and surrounds the quencher. Still further, the outlet of the pilot combustor can include a plurality of apertures formed in a radially outer surface thereof for directing a second source of cooling air toward the combustion products exhausted from the pilot combustor.

The quencher is disposed within the internal chamber of the burner housing along the central axis and positioned at the outlet of the pilot combustor. The quencher has an air inlet and a plurality of radially-oriented air outlets for directing cooling air toward the outlet of the pilot combustor and quenching the combustion products exhausted from the pilot combustor.

It is envisioned that some embodiments of the disclosed burners include a flame holder disposed within the internal chamber of the burner housing. The flame holder has a base portion that is engaged with the burner housing and an elongated cylindrical bluff body extending in an axially downstream direction from the base portion into the internal chamber. Preferably, the flame holder has an axially-extending central air passage formed therein which communicates with the quencher inlet and supplies air thereto.

It is envisioned that exemplary embodiments of the disclosed burners can further include a quarl device disposed adjacent to the downstream end of the burner housing. The quarl device defines an interior recirculation chamber and a burner exit. The interior recirculation chamber is adapted for receiving precombustion gases from the mixing chamber and for recirculating a portion of the combustion products in an upstream direction so as to aid in stabilizing combustion.

It is further envisioned that the disclosed burners can include an igniter positioned along the central axis for the burner housing and adapted for igniting a main lean combustion within the internal chamber of the burner housing at a forward stagnation point of a main recirculation zone.

The present invention is also directed to a burner for a gas turbine combustor which includes a burner housing that defines a main internal combustion chamber, a device for creating heat and free radicals within the housing and a mechanism for quenching the heat and free radicals prior to proving the heat and free radicals to the main internal combustion chamber. Preferably, the quenched heat and free radicals are provided along the axis of the burner housing to the main internal combustion chamber.

The burner housing has axially opposed upstream and downstream end portions and at least one main fuel inlet passage and at least one main air inlet passage which are adapted to supply fuel and air respectively to the internal main combustion chamber defined in the housing.

The device for creating heat and free radicals is disposed within the burner housing and provides the heat and free radicals to the main internal combustion chamber of the housing. It is envisioned that the device which creates heat and free radicals can be a pilot combustor disposed along the axis of the burner housing. Preferably, the pilot combustor includes at least one inlet for receiving a rich fuel and air mixture, a combustion chamber within which the rich fuel and air mixture is combusted into heat and free radicals, and an outlet for exhausting the heat and free radicals from the combustion chamber.

The mechanism for quenching the heat and free radicals immediately prior to their entry into the main internal combustion chamber is also disposed within the burner housing. It is envisioned that the means for quenching the exhausted heat and free radicals includes a quencher disposed within the internal chamber of the burner housing along the central axis. Preferably, the quencher is positioned at the outlet of the pilot combustor and includes an air inlet and a plurality of radially-oriented air outlets for directing cooling air toward the outlet of the pilot combustor and quenching the combustion products exhausted from the pilot combustor.

Embodiments of the disclosed burners can further include a flame holder disposed within the internal chamber of the burner housing. The flame holder includes a base portion engaged with the burner housing and an elongated cylindrical bluff body extending in an axially downstream direction from the base portion into the main internal combustion chamber. It is presently preferred that the flame holder has an axially-extending central air passage formed therein which communicates with the quencher inlet and supplies air thereto.

It is also envisioned that the disclosed burners can includes quarl device disposed adjacent to a downstream end portion of the burner housing. The quarl device defines an interior recirculation chamber and a burner exit. The interior recirculation chamber is adapted for receiving precombustion gases from the main internal combustion chamber and for recirculating a portion of the combustion products in an upstream direction so as to aid in stabilizing combustion.

BRIEF DESCRIPTION OF THE DRAWINGS

So that those having ordinary skill in the art to which the present application appertains will more readily understand how to make and use the same, reference may be had to the drawings wherein.

These and other features of the burner of the present application will become more readily apparent to those having ordinary skill in the art form the following detailed description of the preferred embodiments.

DETAILED DESCRIPTION OF PREFERRED EMBODIMENTS

Figure 2:
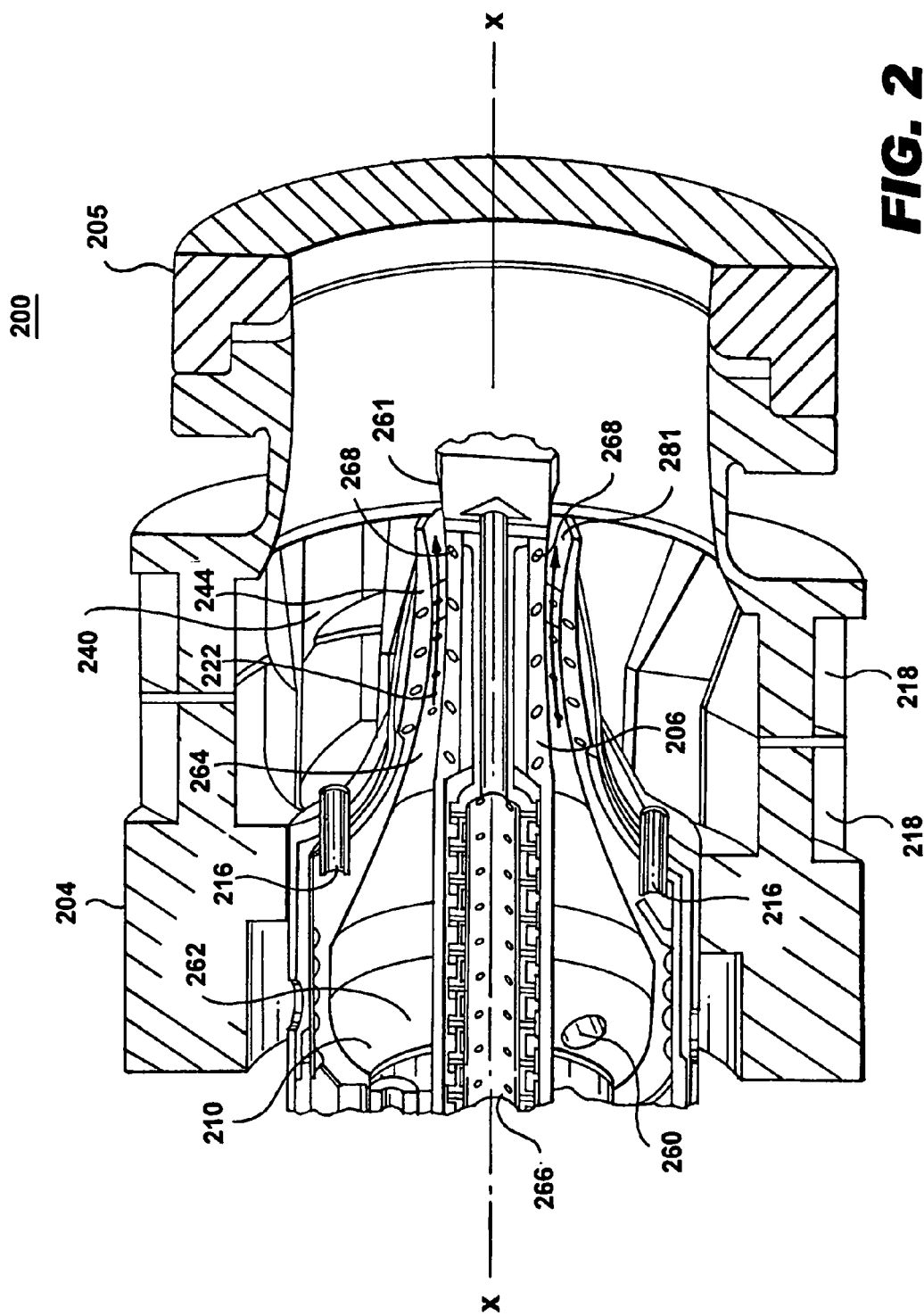
FIG. 2 is a perspective view in cross-section of the swirl stabilized burner of the subject invention which includes a pilot combustor to assist in sustaining and stabilizing the combustion process.
Figure 3:
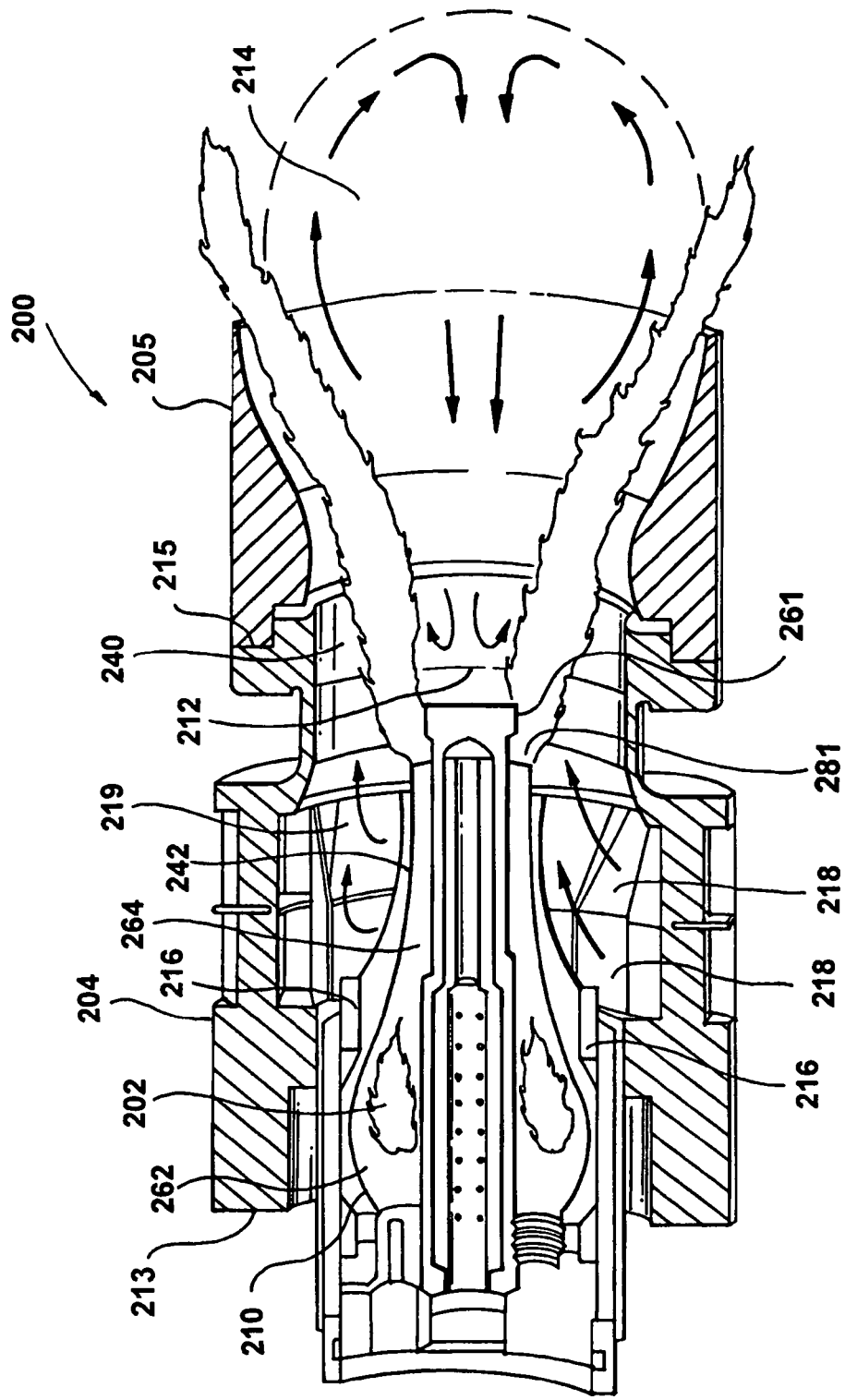
FIG. 3 is a cross-sectional view of the burner of FIG. 2 illustrating the swirl flow within the burner and the anchoring of the forward stagnation point of a main recirculation zone and the flame front by the center bluff body flame holder.

Referring now to FIGS. 2 and 3, which illustrate an exemplary embodiment of the burner of the subject application, which has been designated by reference numeral 200. Burner 200 uses a pilot flame 202 to assist in sustaining and stabilizing the combustion process. Burners 200 includes, inter alia, a burner housing 204, a pilot or pilot combustor 210 and a quencher 206. The burner housing 204 has axially opposed upstream and downstream end portions 213 and 215, respectively, and an exit section 205. Additionally, the housing 204 has several main fuel inlet passages 216 and several air inlet passage 218 which are adapted to supply fuel and air respectively to an internal combustion chamber 219 defined in the housing 204.

The pilot combustor 210 is disposed along the axis X-X of the burner housing 204 and has an inlet 260 for receiving a rich fuel and air mixture, a combustion chamber 262 within which the rich fuel and air mixture is combusted into combustion products, and an outlet 264 for exhausting the combustion products from the combustion chamber. The quencher 206 is disposed within the internal chamber 219 of the burner housing 204 along the central axis X-X and positioned at the outlet 264 of the pilot combustor 210. The quencher 206 has an air inlet 266 and a plurality of radially-oriented air outlets 268 for directing cooling air toward the quench section 222 of the pilot combustor 210 and quenching the combustion products exhausted from the pilot combustor.

Burner 200 includes a low NOx emissions pilot 210 that "generates" free radicals and heat that are directed at the forward stagnation point 212 and into the shear layer of the main recirculation zone 214. Burner 200 utilizes a pilot 210 that burns rich in order to:

- Provide a stable high temperature heat source without high NOx emission,
- Provide high quantities of free radicals (rich combustion at high temperature produces very high levels of free radicals), and
- Provide the widest achievable stability limits.

The rich combustion products must be quenched before mixing with the lean premixed main fuel and air in order to prevent high temperature combustion, which would result in the production of NOx emissions. The rich combustion produces low NOx emissions with high carbon monoxide (CO) and unburned hydrocarbons due to the low oxygen levels. The unburned hydrocarbon and CO produced by the rich pilot 210 will be burned during the lean partially premixed combustion of the "main" premixed fuel.

Rich Quench Lean (RQL) combustion systems are intended to produce low NOx emissions by rich combustion. The combustion process is called rich, when more fuel is supplied or consumed during combustion process than there is air available to react with it. Rich combustion results in low NOx emission, because the oxygen that is available will prefer to react with the hydrogen and carbon of the fuel, and not with nitrogen. Rich combustion is also very desirable, because it is very stable and readily ignitable. Generally, the rich flammability limits are wider than lean limits, and flame temperature does not drop as fast when made richer, compared to lean combustion made leaner. Rich combustion also produces high power flux densities, because of the large amount of energy released compared to the air mass flow rate. The main disadvantages of rich combustion are: 1) not all of the fuel is fully reacted, resulting in decreased thermal efficiency, and 2) high concentration of unburned hydrocarbons and carbon monoxide in the exhaust. The stability of rich combustion and the high power density make rich combustion acceptable for many applications where emissions of unburned hydrocarbons and carbon monoxide are less of an issue and high power per weight ratio is highly desirable. Generally, it is not a trend to use rich combustion alone for industrial power generation, because significantly lower emissions levels are achieved during lean operation.

The Rich Quench Lean concept is a method of burning rich to gain the stability of rich combustion without the formation of excessive levels of NOx, and then transitioning to lean combustion to complete the combustion process. NOx emissions are not produced during the rich combustion, because there is insufficient oxygen and NOx is not formed during the lean combustion because the temperature is low. The combustion temperature is low for the lean combustion, because the extra air cannot react, does not produce heat, but must be heated by the fuel and air that does react. The key or critical issue associated with successful Rich-Quench-Lean combustion is the quench process. In the transition from rich to lean the mixture must pass through the stoichiometric ideal mixture where the flame temperature is maximized and NOx can be produced. These reactions at stoichiometric conditions will occur very fast because of the high temperatures and large pool of free radicals that exist as the result of the previous rich combustion. If the quench process does not occur very fast, high levels of NOx emissions will result from high temperature combustion occurring during the quench process.

Referring again to FIGS. 2 and 3, a RQL combustor or pilot 210 is used as a pilot injector located on the centerline X-X of a swirl stabilized lean partially premixed burner/combustor 200. The RQL combustor/pilot 210 supplies supplemental high concentrations of free radicals and heat directly to the forward stagnation point 212 and shear layer where the lean premixed flow mixes with hot gases of the main recirculation zone 214. In this invention a central bluff body flame holder 261, at the exit 281 of the RQL combustor/pilot 210, is used to stabilize the location of the forward stagnation point 212 of the main recirculation zone 214 which helps to stabilize and enables continuous combustion of the main premixed fuel and air.

The flame holder 261 also functions, in this invention, to supply the quench air to the quench section 242 of the RQL pilot 210. From the opposite wall 244 in the quench section 242, additional quench air can be supplied to intensify the quenching process. These features are best illustrated in FIG. 2. The flame holder 261 in the center of the RQL pilot 210 makes the exit 281 of the RQL pilot an annular passage. This makes the RQL pilot flow passage in the quench section 242 narrow with a high surface area, making the quench more effective. The high surface area allows for many jets of air to be used in the quench process. The narrow gap of the RQL quench flow passage 222 limits the distance that the quench jets must penetrate. The scale of the quench process must be kept small and the velocity of the flow high in order to limit the time period where the mixture is at stoichiometric conditions. The mixing in the quench process must be rapid and thorough; streaks of rich or stoichiometric mixture exiting the quench section 242 would result in high local flame temperatures.

The quench process at the exit 281 of the RQL pilot 210 must be rapid because of the large concentration of the free radicals that emerge from the rich combustion process. The large free radical pool makes the induction time for the initiation of the reaction of the remaining unburned hydrocarbons very rapid when mixed with additional oxygen from the air during the quenching process. The dimensional scale and turbulence scale of the quench must be small when air is used as the quench medium. This makes it difficult to use Rich-Quench-Lean combustion as the primary form of combustion in large gas turbines that require high volumetric flow rates.

The very large pool of free radicals that emerge from an RQL system, which makes large scale quenching difficult, is also what makes the RQL an ideal pilot for lean premixed combustion. The high concentration of free radicals in the RQL pilot exhaust will support rapid and stable combustion in very lean main swirl stabilized combustion that would otherwise be too lean and at too low of temperature to be stable. The ability to operate very lean without engine flameout is a very useful characteristic for engine startup and to handle rapid engine load changes without over-speeding the engine.

In swirl stabilized combustion, the process is initiated and stabilized by means of transporting heat and free radicals from the previously combusted fuel and air, back upstream towards the flame front. If the combustion process is very lean, as is the case in lean-partially premixed combustion systems, the combustion temperature is low, resulting in very low equilibrium levels of free radicals. Complicating this issue is that at high engine pressures the free radicals produced by the combustion process quickly relax to the equilibrium level that corresponds to the temperature of the combustion products. This is due to the fact that the rate of this relaxation of the free radicals to equilibrium levels increases exponentially with increasing pressure, while on the other hand the equilibrium level of free radicals decreases exponentially with decreasing temperature.

The higher the level of free radicals available for initiation of combustion, the more rapid and stable the combustion process will tend to be. At the high pressures, which modern Gas Turbines operate in, the relaxation time of the free radicals can be short compared to the "transport" time required for the free radicals to be convected downstream, from the point where they were produced in the shear layer of the main recirculation zone, back upstream, towards the flame front and the forward stagnation point of the main recirculation zone. As a consequence, by the time the re-circulating flow within the main recirculation zone has convected free radicals back towards the flame front where they mix and initiate combustion of the incoming "fresh" premixed lean fuel and air mixture at the forward stagnation, the free radicals could have reached such a low equilibrium level that stable combustion is not initiated.

In this invention, the scale of the RQL pilot is kept small and most of the combustion of fuel occurs in the lean premixed main combustor 240, and not in the RQL pilot combustor 210. The RQL pilot 210 can be kept small, because the free radicals are released near the forward stagnation point 212 of the main recirculation zone 214. This is generally the most efficient location to supply additional heat and free radicals to swirl stabilized combustion. Because the free radicals and heat produced by the RQL pilot combustor 210 are used efficiently, its size can be small and the quenching process can be effective.

Burner 200 utilizes high non-equilibrium levels of free radicals to stabilize the main lean combustion. Because the outlet of the RQL quench is at the forward stagnation point 212 of the recirculating flow, the time scale between quench and utilization of free radicals is very short, not allowing free radicals to relax to low equilibrium levels. The flame holder 261 maintains the forward stagnation point 212 at the exit of the quench section 242 of the pilot 210 or quencher to assure the distance and time from quench to mixing of the free radicals with the premixed fuel and air is as short and direct as possible. This is very advantageous for high-pressure gas turbine engines, which inherently exhibit severe thermoacoustic instabilities. Aero gas turbine engines have high-pressure ratios in order to maximize their power to weight ratio. This invention will be most advantages to these aero engines, aero derivative industrial engine that also operate at high pressure, as well as high-pressure industrial engines.

Figure 1:
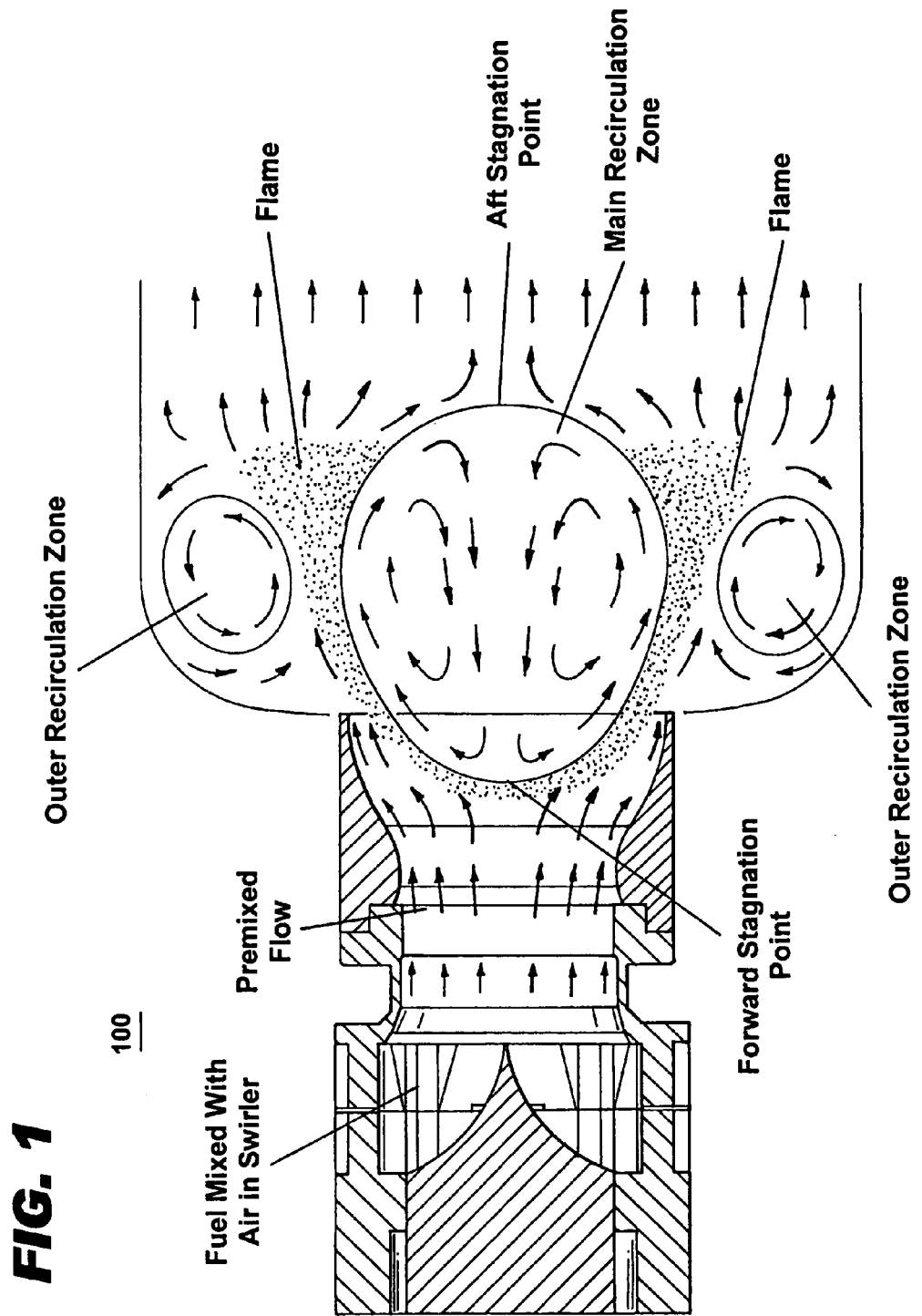
FIG. 1 is a cross-sectional view of a prior art burner which recirculates the combustion products in an attempt to create self-sustaining combustion.

This invention also allows for the ignition of the main combustion to occur at the forward stagnation point 212 of the main recirculation zone 214. Most gas turbine engines must use the outer recirculation zone (see FIG. 1) as the location where the spark, or torch igniter, ignites the engine. Ignition can only occur if stable combustion can also occur; otherwise the flame will just blow out immediately after ignition. The inner or main recirculation zone 214 is generally more successful at stabilizing the flame, because the recirculated gas is transported back to a point region, instead of a ringed region about the outside of the main premixed flow. The heat from the recirculated combustion products is focused to a small region at the forward stagnation point 212 of the main recirculation zone 214. The combustion also expands outward in a conic shape from this forward stagnation point, within burner exit section 205, as illustrated in FIG. 3. This conic expansion downstream allows the heat and free radicals generated upstream to support the combustion downstream allowing the flame front to widen as it moves downstream. The center bluff body flame holder 261 illustrated in FIG. 2, compared to swirl stabilized combustion without the center bluff body flame holder shown in FIG. 1, shows how the flame holder 261 shapes the flame to be more conic and less hemispheric in nature. The more conic flame front allows for a point source of heat to initiate combustion of the whole flow field effectively. This source of heat and free radicals can either be the recirculated hot combustion product, the RQL pilot 210, or both in combination.

When the igniter is placed in the outer recirculation zone, the fuel/air mixture entering this region must often be made rich in order to make the flame temperature sufficiently hot to sustain stable combustion in this region. The flame then often cannot be propagated to the main recirculation until the main premixed fuel and airflow becomes sufficiently rich, hot and has a sufficient pool of free radicals, which occurs at higher fuel flow rates. When the flame cannot propagate from the outer recirculation zone to the inner main recirculation zone shortly after ignition, it must propagate at higher pressure after the engine speed begins to increase. This transfer of the initiation of the main flame from the outer recirculation zone pilot only after combustor pressure begins to rise results in more rapid relaxation of the free radicals to low equilibrium levels, which is an undesirable characteristic that is counter productive for ignition of the flame at the forward stagnation point of the main recirculation zone. Ignition of the main recirculation may not occur until the pilot sufficiently raises the bulk temperature to a level where the equilibrium levels of free radicals entrained in the main recirculation zone and the production of addition free radicals in the premixed main fuel and air mixture are sufficient to ignite the main recirculation zone. In the process of getting the flame to propagate from the outer to the main recirculation zone, significant amounts of fuel exits the engine without burning from the un-ignited main premixed fuel and air mixture. A problem occurs if the flame transitions to the main recirculation zone in some burner before others in the same engine, because the burners where the flame stabilized on the inside burn hotter since all of the fuel is burnt. This burner-to-burner temperature variation can damage engine components. This invention ignites the main recirculation zone directly with the RQL pilot 210, avoiding these problems. The RQL pilot 210 is easy to ignite because the mixture within the RQL pilot combustor 210 can be rich upon ignition without having to make the entire engine rich.

Those skilled in the art will readily appreciate that the inventive aspects of this disclosure can be applied to any type of combustor or burner, such as a solid fuel burner or furnace.

What is claimed is:

1. A burner for a gas turbine engine comprising:
 a) a burner housing defining a longitudinal axis and having axially opposed upstream and downstream end portions, the housing having at least one fuel inlet passage and at least one air inlet passage which are adapted to supply fuel and air respectively to a main internal combustion chamber defined in the burner housing;
 b) a pilot combustor disposed within the main internal combustion chamber of the burner housing and having a central axis aligned along the longitudinal axis of the burner housing, the pilot combustor having an inlet for receiving a rich fuel and air mixture, a pilot combustion chamber within which the rich fuel and air mixture is combusted into combustion products, and an outlet for exhausting the combustion products from the pilot combustion chamber; and
 c) a quencher disposed within the burner housing and having an air inlet and a plurality of air outlets for directing cooling air toward the outlet of the pilot combustor to cool the combustion products exhausted from the pilot combustor;

wherein the outlet of the pilot combustor has an annular cross-section adjacent to the quencher.

2. A burner for a gas turbine engine comprising:
   a) a burner housing defining a longitudinal axis and having axially opposed upstream and downstream end portions, the housing having at least one fuel inlet passage and at least one air inlet passage which are adapted to supply fuel and air respectively to a main internal combustion chamber defined in the burner housing;
   b) a pilot combustor disposed within the main internal combustion chamber of the burner housing and having a central axis aligned along the longitudinal axis of the burner housing, the pilot combustor having an inlet for receiving a rich fuel and air mixture, a pilot combustion chamber within which the rich fuel and air mixture is combusted into combustion products, and an outlet for exhausting the combustion products from the pilot combustion chamber; and
   c) a quencher disposed within the burner housing and having an air inlet and a plurality of air outlets for directing cooling air toward the outlet of the pilot combustor to cool the combustion products exhausted from the pilot combustor;
   further comprising a flame holder disposed within the internal chamber of the burner housing and including an elongated cylindrical bluff body extending in an axially downstream direction into the internal chamber.

3. A burner as recited in claim 2, wherein the flame holder has an axially-extending central air passage formed therein which communicates with the quencher inlet and supplies air thereto.

4. A burner as recited in claim 1, wherein the outlet of the pilot combustor has a plurality of apertures for directing a second source of cooling air toward combustion products exhausted from the pilot combustor.

5. A burner for a gas turbine engine comprising:
   a) a burner housing having axially opposed upstream and downstream end portions, the housing having at least one fuel inlet passage and at least one air inlet passage which are adapted to supply fuel and air respectively to an internal main combustion chamber defined in the housing, wherein the main combustion chamber provides a main recirculation zone for combustion products generated within the main combustion chamber;
   b) pilot combustor means disposed within the burner housing for creating heat and free radicals and providing the heat and free radicals to the internal main combustion chamber of the housing, wherein the pilot combustor means includes an outlet having an annular cross-section from which the heat and free radicals are exhausted; and
   c) means disposed within the burner housing for directing cooling air toward the outlet of the pilot combustor means.

6. A burner as recited in claim 5, wherein the heat and free radicals exit the pilot combustor means along the axis of the burner housing for entry to the internal main combustion chamber.

7. A burner as recited in claim 5, wherein the pilot combustor means includes a pilot combustor which shares a common central axis with the burner housing.

8. A burner as recited in claim 7, wherein the pilot combustor includes at least one inlet for receiving a rich fuel and air mixture, and a pilot combustion chamber within which the rich fuel and air mixture is combusted into heat and free radicals.

9. A burner as recited in claim 8, wherein the means for directing cooling air includes a quencher positioned at the outlet of the pilot combustor, wherein the quencher includes air outlets for directing cooling air toward the outlet of the pilot combustor.

10. A burner as recited in claim 5, further comprising a flame holder disposed within the burner housing and including an elongated cylindrical bluff body extending in an axially downstream direction into the internal main combustion chamber.

11. A burner as recited in claim 10, wherein the flame holder has an axially-extending central air passage formed therein which supplies cooling air thereto.

* * * * *

UNITED STATES PATENT AND TRADEMARK OFFICE
CERTIFICATE OF CORRECTION

PATENT NO.      : 7,621,132 B2
APPLICATION NO. : 10/933888
DATED           : November 24, 2009
INVENTOR(S)     : Cornwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Twenty-sixth Day of October, 2010

David J. Kappos
*Director of the United States Patent and Trademark Office*